(12) United States Patent
Engle

(10) Patent No.: US 7,517,092 B2
(45) Date of Patent: Apr. 14, 2009

(54) METHOD AND SYSTEM FOR DYNAMIC GRADIENT LIGHT FILTERING

(75) Inventor: T. Scott Engle, Beaverton, OR (US)

(73) Assignee: InFocus Corporation, Wilsonville, OR (US)

( * ) Notice: Subject to any disclaimer, the term of this patent is extended or adjusted under 35 U.S.C. 154(b) by 382 days.

(21) Appl. No.: 11/237,194

(22) Filed: Sep. 27, 2005

(65) Prior Publication Data

US 2007/0070301 A1 Mar. 29, 2007

(51) Int. Cl.
G03B 21/14 (2006.01)
G03B 21/00 (2006.01)
G02B 5/22 (2006.01)
H04N 9/12 (2006.01)

(52) U.S. Cl. ............... 353/84; 353/97; 353/121; 359/885; 348/743

(58) Field of Classification Search ............ 353/84, 353/97, 122, 121; 359/885, 887–892; 348/742, 348/743

See application file for complete search history.

(56) References Cited

U.S. PATENT DOCUMENTS

| | | | |
|---|---|---|---|
| 5,515,119 A * | 5/1996 | Murdock et al. | 352/131 |
| 5,650,832 A | 7/1997 | Poradish et al. | |
| 6,011,640 A * | 1/2000 | Hutton | 359/234 |
| 6,517,210 B2 | 2/2003 | Peterson et al. | 353/98 |
| 6,870,660 B2 | 3/2005 | DiCarlo | 359/291 |
| 6,874,893 B2 * | 4/2005 | Park | 353/84 |
| 6,879,451 B1 * | 4/2005 | Hewlett et al. | 359/891 |
| 2003/0011910 A1 * | 1/2003 | Weiss | 359/891 |
| 2006/0007686 A1 * | 1/2006 | Hough | 362/293 |

OTHER PUBLICATIONS

ISA U.S., International Search Report of PCT/US2006/034976, Jun. 11, 2008, WIPO.

* cited by examiner

Primary Examiner—Diane I Lee
Assistant Examiner—Magda Cruz
(74) Attorney, Agent, or Firm—Alleman Hall McCoy Russell & Tuttle LLP

(57) ABSTRACT

A light filter for use in an optical system for displaying image. The light filter comprising, a substantially transparent substrate and an optical coating applied to the substrate. The optical coating is applied to the substrate such that a percentage of light being directed through the filter that is attenuated varies based on a position on the substrate on which the light impinges.

16 Claims, 2 Drawing Sheets

METHOD AND SYSTEM FOR DYNAMIC GRADIENT LIGHT FILTERING

BACKGROUND

I. Field

This invention is related to the field of display devices, such as projection display devices. More particularly, the invention is related to methods and systems for attenuating light when displaying images with such display devices.

II. Description of Related Art

Display technology (e.g., for use in computer and entertainment display devices) continues to advance, as generally is the case with consumer and business electronics. Display devices (such as digital display projectors, flat panel displays, plasma displays, cathode-ray-tube (CRT) displays, etc.) continue to improve in the quality and resolution of the images they display. A wide variety of such a display systems is available from InFocus Corporation of Wilsonville, Oreg., the assignee of the present application.

Projection display devices, such as those manufactured by InFocus, include an optical subsystem for displaying images (e.g., still images or video). Such optical subsystems typically include an illumination source (e.g., a high pressure mercury lamp) for generating light. Light is typically generated in a plurality of primary colors (e.g., red, green and blue) using a color wheel or, as one alternative, using separate light sources for each primary color, where the separate light sources are turned on in sequence. The generated light is then directed, focused and modulated to display images (e.g., still or moving) on a display surface, such as a screen or wall. Light may be modulated using any number of approaches. For example, a digital micro-mirror device may be used to modulate light. Such devices are know and are described in U.S. Pat. No. 6,870,660, entitled "Digital micromirror device having mirror-attached spring tips", which is incorporated by reference herein in it entirety. As an alternative, a liquid crystal array may be used to modulate the primary color light to generate displayed images. Of course, other approaches are possible.

Such systems typically include service logic that is implemented in software, hardware and/or firmware for analyzing the content of the image or images being displayed the display system. Based on the information produced by this image analysis, the display device may modify the manner in which images are displayed.

As one example, based on analysis of an image or series of images (e.g., video content) being displayed, the display device may determine that the content of the image or images is generally dark. When viewing such video content, it may be observed that the brightness transitions are relatively poor as compared with brighter scenes. Due to limitations in the number of steps of brightness available (e.g., resolution), steps from one level of brightness intensity to the next may be visibly abrupt to a viewer of the displayed images. These abrupt steps negatively affect the quality of the image and, therefore, the viewer experience.

As an example of this situation, for a display device that displays images with 8 bits of resolution there are 256 levels of brightness that are available. If these 256 levels are divided equally over the entire range of possible brightness (e.g., in a stepwise linear fashion), transitions from one level to the next will be more readily observable by a viewer at the lower brightness levels due the percentage change in brightness that occurs during those transitions. For instance, transitions at the lowest brightness levels will result in one-hundred percent change in brightness. Accordingly, these transitions are often readily observable when displaying video content with a low level of brightness (e.g., dark scenes).

One approach that is used to address this concern is to reduce the range of brightness over which the number of brightness steps is spread. This is accomplished by placing a solid object in a portion of the path of the light that is used for projecting the video content. For instance, if it is determined by the display device (e.g., using the image analysis service logic described above) that the desired maximum brightness for a particular portion of the video content (e.g., a dark scene in a movie) is half of the maximum white brightness available, then the solid object may be placed such that it reduces the amount of light used to the project the scene by fifty percent. This results in the reduction of the brightness steps by half as well, as the 256 steps are divided over half of the brightness range (e.g., half of the light is blocked).

While such an approach may reduce the perception of abrupt brightness transitions, such approaches still have certain drawbacks. For example, because the light is completely blocked in half of the field and not blocked in the other half, there may still be portions of the displayed images that have abrupt brightness transitions, such as in the portions of the images corresponding with the unblocked portion of the field. Additionally, other portions of the image may have poor contrast, such as in the portions of the images corresponding with the completely blocked portion of the display field. Based on the foregoing, alternative approaches for displaying images or video content with reduced brightness are desirable.

BRIEF DESCRIPTION OF THE DRAWINGS

Various embodiments are described herein with reference to the drawings, in which.

DETAILED DESCRIPTION

Figure 1:
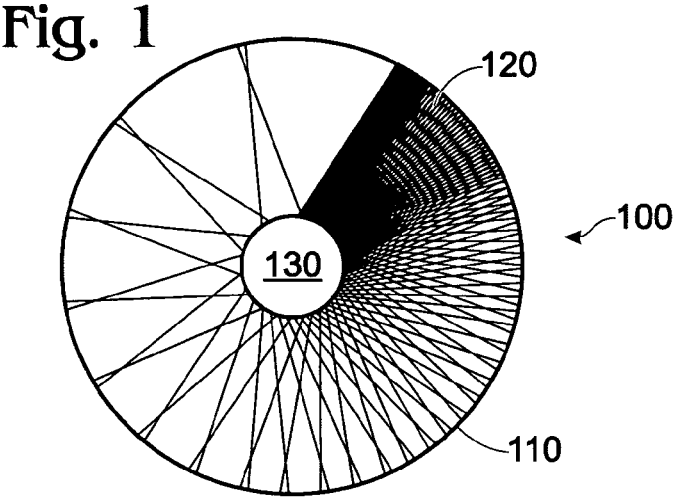
FIG. 1 is a drawing illustrating a gradient filter for attenuating light in a display device.

While embodiments of display devices and dynamic gradient filters are generally discussed herein with respect to consumer projection display devices, it will be appreciated that the invention is not limited in these respects and that embodiments of the invention may be implemented in any number of different types of display devices. For example, the embodiments described herein may be employed in projection televisions, computer displays and movie theater projectors, among any number of other devices.

Further, as in most consumer/business electronics applications, it will also be appreciated that many of the elements of the various embodiments described herein are functional entities that may be implemented as hardware, firmware and/or software, and as discrete components or in conjunction with other components, in any suitable combination and location. Furthermore, the drawings are to be used for purposes of illustration. Accordingly, it is noted that the elements shown in the drawings are not necessarily to scale or shown in an arrangement as they would be in a display device.

Gradient Light Filters

Referring to FIG. 1, a drawing illustrating a gradient light filter 100 is shown. The light filter 100, when implemented in a projection display system, is used to attenuate a substantially constant percentage of light across substantially an entire illumination field for an image or images (e.g., still or video content) being displayed. The filter 100 may be implemented at various locations in an optical system of a display device to attenuate light. For example, the light filter 100 may be placed in an optical system so as to attenuate primary color light that is generated by an illumination source. Alternatively, the filter 100 may be implemented in the optical system so as to attenuate modulated light corresponding with an image or images being displayed.

The filter 100 comprises a circular substrate 110. The substrate 110 may be formed from any number of suitable materials. For example, the substrate 110 may be formed from transparent materials, such as glass or a high temperature polymer of good optical quality.

The filter 100 further includes an optical coating 120 that is applied to the substrate 110 in an angularly gradient fashion, such that the amount of light attenuated across an illumination field in a display device is selectable based on the angular position of the filter 100. For instance, the optical coating may be applied in sections (e.g., pie shaped sections) on the substrate 110 with each adjacent section each resulting in a different amount of light attenuation.

Various types of materials may be used to implement the optical coating 120. For example, the coating 120 may take the form of a dichroic coating, a reflective coating, or a mag-fluoride coating, among any number of other suitable materials. Such coatings are available and may be obtained from any number of suppliers. For example, such coatings may be obtained from, or actually applied to the substrate 110 by JDS Uniphase Corporation, 1768 Automation Parkway, San Jose, Calif. 95131.

It will be appreciated that any number of techniques may be employed to apply the optical coating 120. For example, the coating 120 may be applied to the substrate 100 using a sputter deposition technique. Alternatively, the coating may be applied using a vapor deposition technique. Of course, any number of other approaches may be employed to apply the coating 120. For instance, such gradient coatings may be applied using a mask (not shown) that moves over the surface of the substrate 100 as the coating material is applied. In such approaches, the gradient nature of the coating is achieved by controlling the amount of time each section of the substrate 100 is exposed while the coating material is being applied.

The filter 100 also includes an attachment point 130, which may be a shaft, or some other appliance that is used to couple the filter 130 with a positioning device, such as a rotational stepper motor. The attachment point 130 may be affixed to the filter 100 using any appropriate technique. For example, the attachment point 130 may be affixed to the filter 100 using conventional fasteners, such as a screw that is inserted through a bore formed in the geometric center of the filter 100 and then threaded into the attachment point 130. Alternatively, the attachment point 130 may be affixed the filter 100 using an adhesive, or any suitable combination of fastening techniques.

Figure 2:
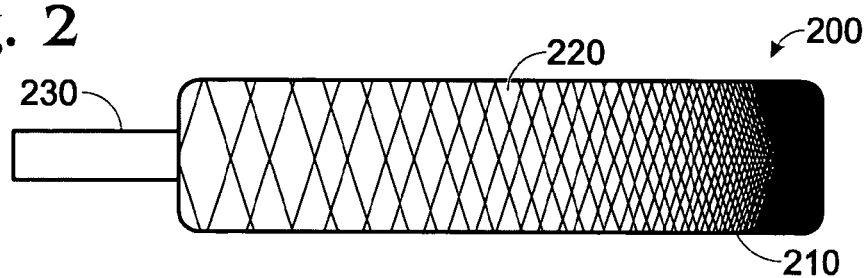
FIG. 2 is a drawing illustrating an alternative gradient filter for attenuating light in a display device.

Referring to FIG. 2, a drawing illustrating an alternative optical filter 200 is shown. The optical filter 200 includes an elongated (e.g., rectilinear) substrate 210. The substrate 210 may be formed from the same materials described above with respect to the optical filter 100 shown in FIG. 1. The filter 200 also includes an optical coating 220 that is applied in a linearly gradient fashion. As with the optical coating 120 of the filter 100, the optical coating 220 may be applied in sections (e.g., square or rectangular sections) with each adjacent section attenuating a different amount of light.

The substrate 210 of the filter 200 may, in like fashion as the substrate 110 of the filter 100, be formed of any number of materials These materials may include glass or high temperature resistant polymers of good optical quality. The use of high temperature resistant materials is particularly important if the filter 200 (or the filter 100 of FIG. 1) is located in close physical proximity with the illumination source of a display device in which it is employed. This is important because such illumination sources may take the form of, for example, a pressure mercury lamp and, therefore, generate a substantial amount of heat. If the substrate and the optical coating are not high temperature resistant, locating the filter in close physical proximity with the illumination source may result in degradation and/or destruction of the filter 200 (or the filter 100).

The filter 200 further includes an attachment point 230, which, in like fashion as the attachment point 130 of the filter 100, may be a shaft or appliance that is used to couple the filter 200 with a linear stepper. As with the attachment point 130, the attachment point 230 may be affixed to the substrate 210 of the filter 200 using any appropriate technique (e.g., screws and/or adhesives).

Optical Systems with Gradient Light Filters

Figure 3:
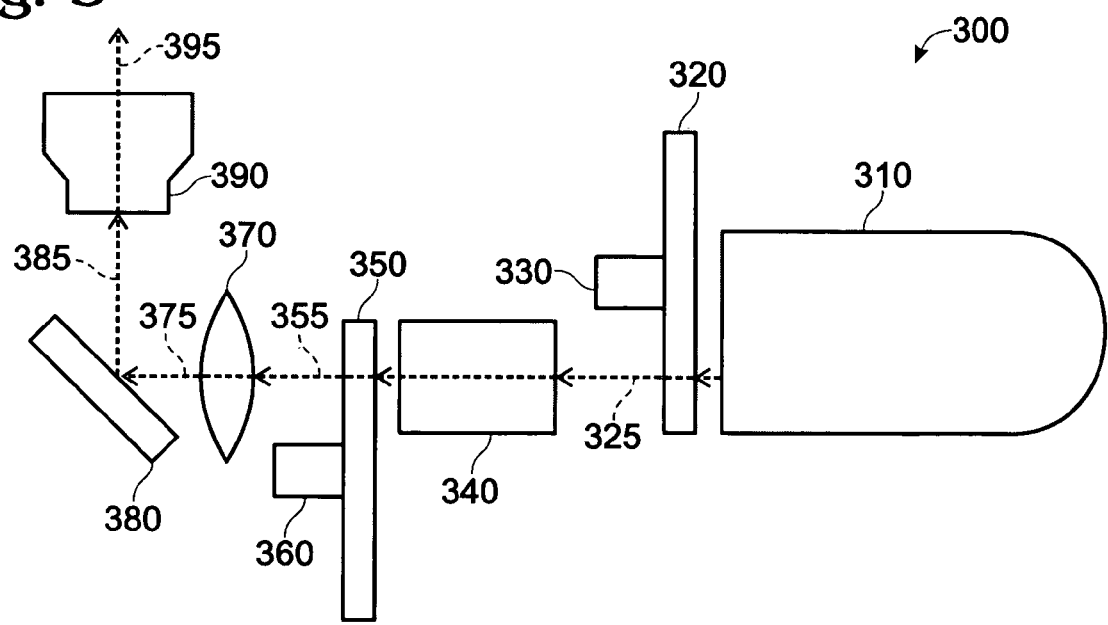
FIG. 3 is a drawing illustrating an optical system for displaying images that includes the gradient filter illustrated in FIG. 1.

Referring to FIG. 3, an optical system 300 for use in a display device, such as a digital projection display device that employs a DMD light switch for use in projecting images (still or video) is shown. The optical system 300 includes a lamp 310. The lamp 310 may include a pressure mercury lamp contained in an elliptical reflector, as is illustrated in FIG. 3. The optical system 300 further includes a color wheel 320 and a stepper motor 330 for controlling the color wheel 320. The color wheel 320 may contain discrete red, green and blue sections and rotated at a predetermined speed to generate colored light 325 of the primary colors (red, green and blue) in sequence, as was previously described. For the optical system 300 illustrated in FIG. 3, the lamp 310, the color wheel 320 and the stepper motor 330 may be referred to collectively as the illumination source.

As was discussed above, the illumination source of the system 300 may alternatively take the form of discrete light sources (e.g., three) for producing each of the primary colors (e.g., red, green and blue). These discrete light sources would be turned on and off in sequence to produce colored light 325 for use in projecting images.

The colored light 325 from the illumination source (lamp 310 and color wheel 320 in FIG. 3) is then directed through a light tunnel 340. The light tunnel 340 integrates the light for use in projecting an image or images to be displayed. Such a light tunnel 340 and illumination source are described in U.S. Pat. No. 6,517,210 to Peterson et al., which is assigned to InFocus Corporation, the assignee of the present application. The entire disclosure of U.S. Pat. No. 6,517,210 is incorporated by reference herein. For the sake of brevity, the details of such an arrangement will not be described further here.

The light from light tunnel 340 is then directed onto a gradient light filter 350, which may take the form of the gradient light filter 100 illustrated in FIG. 1. The gradient light filter 350 is coupled with a rotational stepper motor 360 that positions the filter 350 in the path of light being emitted from the light tunnel 340 to attenuate that light in accordance with a desired brightness level, as was described above. For example, if a display device in which the optical system 300 is implemented determines (using service logic as described above) that the brightness for a particular scene is desired to be sixty percent of the total brightness available in the display system, the stepper motor 360 will be directed to orient the gradient filter 350 in the path of the light impinging on it (from the light tunnel 340) to an angular position that corresponds with forty percent attenuation of light along the path.

Attenuated light 355 then exits the gradient filter 350 and impinges on a lens 375 that focuses the attenuated light 355 prior to modulation of that light by a DMD 380 to produce modulated light 385 in correspondence with an image or images to be displayed. The attenuated light 385 then impinges on a projection lens 390 and image light 395 exits the projection lens 390. The image light 395 then impinges on a display surface, such as a screen or a wall, to display the image or images being projected. Such an approach is an example of attenuating the generated light of a plurality of primary colors prior to modulation by a light switch (e.g., the DMD 380). Alternatively, light for displaying images may be attenuated prior to communication of the colored light 325 into the light tunnel 340 (or as yet another alternative, prior to separating the light into primary colors with color wheel 320).

Figure 4:
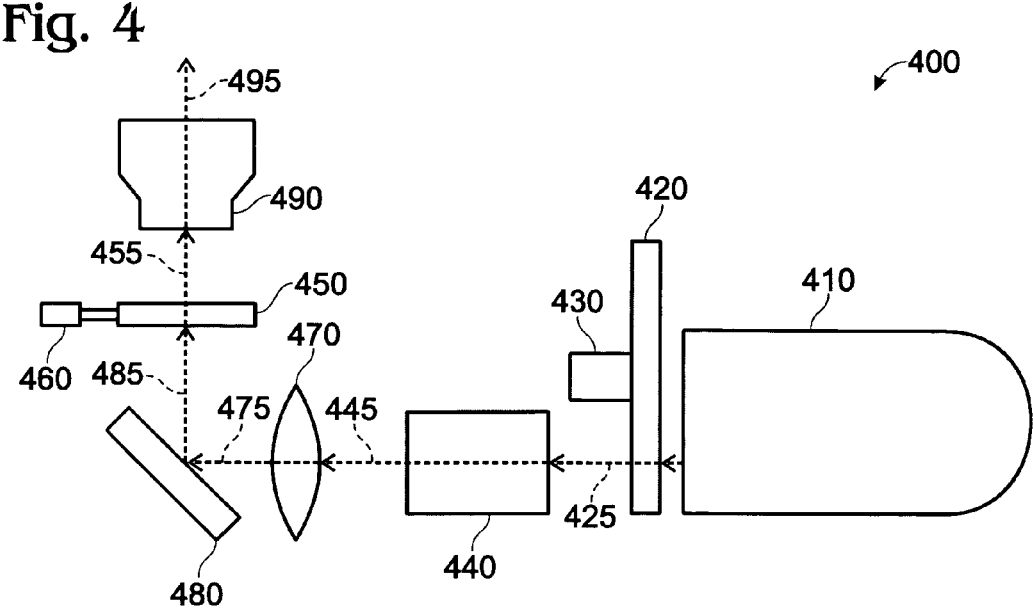
FIG. 4 is a drawing illustrating an alternative optical system for displaying images that includes the gradient filter illustrated in FIG. 2.

Referring to FIG. 4, an optical system 400 is illustrated. The optical system 400 is analogous with the optical system 300 of FIG. 3 in a number of respects. For sake of illustration, elements of the optical system 400 that are analogous with the optical system 300 are referenced with 400 series reference number that correspond with the 300 series reference numbers of FIG. 3. For example, the lamp of the optical system 400 is referenced with reference number 410 as compared to the lamp of the optical system 300, which is referenced with the reference number 310. For the sake of brevity and clarity, only those details needed to understand the differences between the optical system 300 and the optical system 400 will be discussed with respect to FIG. 4.

The optical system 400 includes a gradient light filter 450 that may take the form of the gradient light filter 200 illustrated in FIG. 2. The gradient light filter 450 is coupled with a linear stepper 460. The linear stepper 460 may take the form of a linear stepper motor or, alternatively, may take the form of a voice coil. Such devices are known and are not described in detail here.

As was described above the for the system 300, if a display device in which the optical system 400 is implemented determines that the brightness for a particular scene is desired to be sixty percent of the total brightness available in the display system, the linear stepper 460 will be directed to orient the gradient filter 450 in the path of the light impinging on it (from the DMD 480) to a linear position that corresponds with forty percent attenuation of light along the path.

In this arrangement, the optical system 400 attenuates light used to display images after the light is modulated in accordance with the images. That is, the gradient filter 450 attenuates the modulated light 485 to produce the modulated light 455. The modulated light 455 then impinges on the display lens 490 to produces the image light 495. As with the display system 300, the image light 495 then impinges on a display surface to effect display of the image or images being projected.

Figure 5:
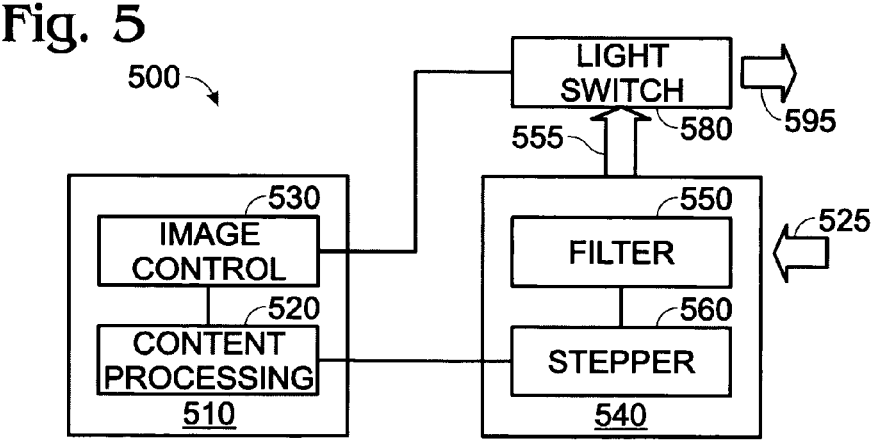
FIG. 5 is a block diagram illustrating a display system that includes a gradient filter, such as the filters illustrated in FIGS. 1 and 2.

Referring to FIG. 5, a block diagram of a display device 500 that includes an optical system similar to the optical system 300 of FIG. 3 is shown. The elements of the optical system of the display device 500 that correspond with like elements of the optical system 300 are referenced with like 500 series reference numbers. In the display device 500, colored light 525 is directed (e.g., via a light tunnel) onto a gradient light filter 550. The gradient light filter 550 produces attenuated light 555 that is then directed onto a light switch 580 (e.g., a DMD) to produce image light 595 (e.g., via a projection lens).

The display device 500 also includes a display control module 510. It is noted that the reference numbers used to reference the display control module and the elements thereof do not correspond with the optical system 300 of FIG. 3. The display control module 520 includes a content processing module 520, which may be implemented using software, hardware and/or firmware. The content processing module 520 analyzes the video content of images to be displayed by the display device 500. The content processing modules then communicates information regarding the images to be displayed to an image control module 530. The image control module 530, in turn, directs the light switch 580 to modulate light in accordance with the images being displayed.

The content processing module 520 also communicates attenuation information to stepper 560. The attenuation information indicates to the stepper 560 a desired amount of brightness for an image or images that are being displayed. In response, the stepper 560 positions the filter 550 in the path of the colored light 525 to attenuate that light in accordance with the desired amount of attenuation. It will be appreciated that the techniques described with respect to FIG. 5 may also be applied to the optical system illustrated in FIG. 4 to attenuate modulated light, or may be implemented in any other appropriate optical system included in a display device.

Relationship of Filter Position to Attenuation Percentage

Figure 6:
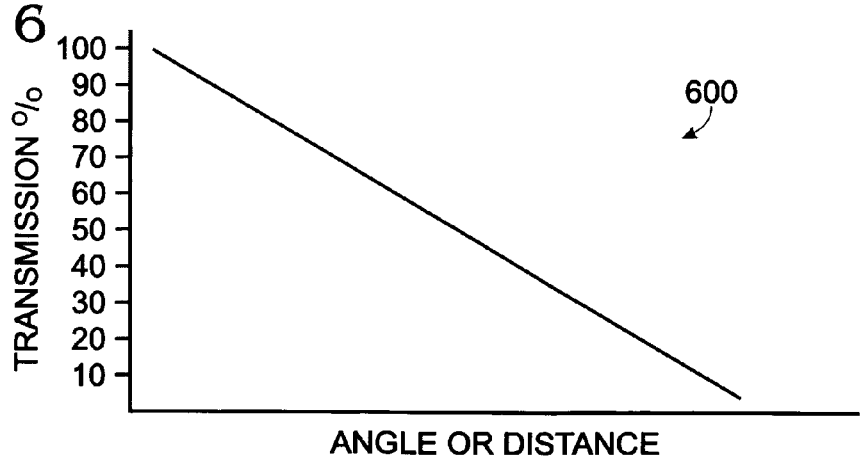
FIG. 6 is a graph illustrating attenuation of light for the filters illustrated in FIGS. 1 and 2.

As was described above, the percentage of light attenuated across the display field (or the corresponding percentage of light transmitted through the filters 100 and 200) is dependent on their position (angular or linear) in the path of light used to project images in which the filters 100 or 200 are implemented. FIG. 6 is a graph 600 that illustrates the dependence of the percentage of light transmitted based on the angular position of the filter 100 shown in FIG. 1 and the linear position of the filter 200 shown in FIG. 2.

As is illustrated in FIG. 6, as the angular position of filter 200 varies (or the linear position of filter 200), the percentage of light transmitted through the filter varies linearly with the change in position. In this particular graph, a variation from 0% attenuation to 90% attenuation is illustrated. Of course, alternative approaches may implement a non-linear relationship between the amount of light transmitted (or attenuated) based on the position of the gradient light filter. The particular relationship between attenuation and filter position will depend, at least in part, on the particular display system in which the gradient filter is implemented.

Conclusion

Various arrangements and embodiments have been described herein. It will be appreciated, however, that those skilled in the art will understand that changes and modifications may be made to these arrangements and embodiments, as well as combinations of the various embodiments without departing from the true scope and spirit of the present invention, which is defined by the following claims.

What is claimed is:

1. An optical system for use in a display device, the optical system comprising:
    an illumination source, including a color wheel, wherein the illumination source produces light of a plurality of colors;
    a digital micromirror device wherein the digital micromirror device modulates the light of the plurality of colors to generate modulated light in correspondence with an image being displayed;

one or more optical elements for directing the light of the plurality of colors and the modulated light so as to display the image; and a position selectable filter spaced apart from the color wheel and operable separately from the color wheel, wherein the filter attenuates a substantially constant percentage of one of (i) the light of the plurality of colors and (ii) the modulated light across the image being displayed, the percentage of attenuation being dependent on a selected position of the filter, wherein the position selectable filter includes an optical coating applied in an angularly gradient fashion where each adjacent section results in a different amount of light attenuation.

2. The optical system of claim 1, wherein the position selectable filter comprises a transparent circular substrate.

3. The optical system of claim 2, wherein the optical coating is a dichroic coating.

4. The optical disk of claim 2, wherein the optical coating is a reflective coating.

5. The optical disk of claim 2, wherein the optical coating is a magnesium-fluoride coating.

6. The optical system of claim 2, further comprising:

a rotational stepper motor coupled with the filter so as to control the angular position of the filter, wherein the stepper motor receives signals from the display device indicating a desired amount of light attenuation and, in response to these signals, adjusts the angular position of the filter in correspondence with the desired amount of light attenuation.

7. The optical system of claim 1, wherein the position selectable filter is downstream of the digital micromirror device.

8. The optical system of claim 7, wherein the optical coating is applied to the substrate using sputter coating.

9. The optical system of claim 7, wherein the optical coating is applied to the substrate using vapor deposition.

10. The optical system of claim 7, further comprising:

a linear stepper coupled with the filter so as to control the linear position of the filter, wherein the linear stepper receives signals from a display device indicating a desired amount of light attenuation and, in response to these signals, adjusts the linear position of the filter in correspondence with the desired amount of light attenuation.

11. The optical system of claim 10, wherein the linear stepper comprises a linear stepper motor.

12. The optical system of claim 10, wherein the linear stepper comprises a voice coil.

13. A method of displaying an image comprising:

producing light of a plurality of colors via a color wheel;

modulating the light of the plurality of colors to generate modulated light in correspondence with the image being displayed;

directing the light of the plurality of colors and the modulated light via a digital micromirror device so as to display the image; and attenuating, via a position selectable filter separate from the color wheel, a substantially constant percentage of one of (i) the light of the plurality of colors and (ii) the modulated light across the image being displayed, the percentage of attenuation being dependent on a selected position of the position selectable filter;

wherein the position selectable filter comprises a transparent substrate coated with an optical gradient coating, where the optical gradient coating is applied by controlling an amount of time each section of the substrate is exposed while a coating material is applied, such that each adjacent section of the position selectable filter results in a different amount of light attenuation.

14. The method of claim 13, further comprising:

analyzing the image being displayed to determine a desired amount of attenuation; and positioning the filter so as to attenuate one of (i) the light of the plurality of colors and (ii) the modulated light in accordance with the desired amount of attenuation.

15. The method of claim 14, wherein positioning the filter comprises rotationally positioning the filter.

16. The method of claim 14, wherein positioning the filter comprises linearly positioning the filter.

* * * * *